United States Patent
Osborne et al.

(10) Patent No.: US 9,866,078 B2
(45) Date of Patent: Jan. 9, 2018

(54) BRUSH ASSEMBLY MOUNT

(71) Applicant: Black & Decker Inc., Newark, DE (US)

(72) Inventors: Stephen P. Osborne, Pikesville, MD (US); Daniel F. Heck, Baltimore, MD (US); Colin M. Crosby, Baltimore, MD (US); Ryan F. Schroeder, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 411 days.

(21) Appl. No.: 14/608,917

(22) Filed: Jan. 29, 2015

(65) Prior Publication Data

US 2015/0214818 A1    Jul. 30, 2015

Related U.S. Application Data

(60) Provisional application No. 61/932,932, filed on Jan. 29, 2014.

(51) Int. Cl.
*H02K 23/66*    (2006.01)
*H02K 1/17*    (2006.01)
(Continued)

(52) U.S. Cl.
CPC .............. *H02K 1/17* (2013.01); *H02K 5/148* (2013.01); *H02K 15/03* (2013.01); *H02K 23/04* (2013.01)

(58) Field of Classification Search
CPC .............................. H02K 23/66; H02K 5/148
See application file for complete search history.

(56) References Cited

U.S. PATENT DOCUMENTS 1,686,324 A *  10/1928  Hillix ..................... H02K 5/00
                                                  310/239
1,858,870 A    5/1932  Apple
(Continued)

FOREIGN PATENT DOCUMENTS

DE          19522329          1/1997
EP          1621293           2/2006
(Continued)

OTHER PUBLICATIONS

EP search report dated Jan. 7, 2016 for EP Application No. 14180418.7.

(Continued)

*Primary Examiner* — Dang Le
(74) *Attorney, Agent, or Firm* — Amir Rohani; Scott Markow

(57) ABSTRACT

An electric motor is provided including a stator assembly having a stator body and magnets attached to an inner surface of the stator body via an adhesive, and an armature rotatably received within the stator assembly and having an armature shaft on which a commutator is mounted. A brush assembly is provided including a brush card mount disposed around the commutator and a mating housing longitudinally extending from the brush card mount. The mating housing includes a cylindrical wall and a mating surface formed substantially perpendicularly to an inner surface of the cylindrical wall and arranged to mate with an end surface of the stator body. The mating surface of the mating housing includes posts longitudinally extending along the inner surface of the cylindrical wall and recessed surfaces formed therebetween, the posts being mounted on the end surface of the stator body.

16 Claims, 7 Drawing Sheets

(51) Int. Cl.
  *H02K 23/04*   (2006.01)
  *H02K 5/14*    (2006.01)
  *H02K 15/03*   (2006.01)

(56) References Cited

U.S. PATENT DOCUMENTS

| | | | |
|---|---|---|---|
| 3,525,891 A | 8/1970 | Lukawich et al. | |
| 3,652,879 A | 3/1972 | Plunkett et al. | |
| 3,875,436 A | 4/1975 | MacFarland | |
| 4,115,030 A | 9/1978 | Inagaki et al. | |
| 4,184,804 A | 1/1980 | Inagaki et al. | |
| 4,276,737 A * | 7/1981 | Henning | A01D 34/695 56/12.8 |
| 4,322,647 A | 3/1982 | Neroda et al. | |
| 4,342,929 A * | 8/1982 | Horne | H02K 1/185 310/43 |
| 4,403,910 A | 9/1983 | Watanabe et al. | |
| 4,491,752 A | 1/1985 | O'Hara et al. | |
| 4,498,230 A | 2/1985 | Harris et al. | |
| 4,504,754 A | 3/1985 | Stone | |
| 4,538,085 A * | 8/1985 | Tanaka | H02K 1/17 310/154.16 |
| 4,593,220 A | 6/1986 | Cousins et al. | |
| 4,694,214 A | 9/1987 | Stewart et al. | |
| 4,734,604 A | 3/1988 | Sontheimer et al. | |
| 4,851,730 A | 7/1989 | Fushiya et al. | |
| 5,021,696 A | 6/1991 | Nelson | |
| 5,049,770 A | 9/1991 | Gaeth et al. | |
| 5,055,728 A | 10/1991 | Looper et al. | |
| 5,264,749 A * | 11/1993 | Maeda | H02K 1/12 29/607 |
| 5,414,317 A | 5/1995 | Reid et al. | |
| 5,714,810 A | 2/1998 | Yuhi et al. | |
| 5,810,111 A | 9/1998 | Takeuchi et al. | |
| 5,818,142 A | 10/1998 | Edlebulte et al. | |
| 5,872,414 A | 2/1999 | Iijima | |
| 5,932,945 A | 8/1999 | Volz et al. | |
| 5,949,175 A | 9/1999 | Cummins | |
| 5,969,450 A | 10/1999 | Satterfield et al. | |
| 5,977,672 A | 11/1999 | Vacca | |
| 6,005,323 A | 12/1999 | Morimoto et al. | |
| 6,020,661 A | 2/2000 | Trago et al. | |
| 6,078,116 A | 6/2000 | Shiga et al. | |
| 6,124,567 A | 9/2000 | Feldhausen et al. | |
| 6,133,665 A | 10/2000 | Prell et al. | |
| 6,166,474 A | 12/2000 | Kohara et al. | |
| 6,288,469 B1 | 9/2001 | Kimura et al. | |
| 6,445,097 B1 | 9/2002 | Zeiler et al. | |
| 6,518,686 B2 | 2/2003 | Campbell et al. | |
| 6,528,910 B2 | 3/2003 | Nakamura et al. | |
| 6,528,921 B1 | 3/2003 | Nakane | |
| 6,541,890 B2 | 4/2003 | Murata et al. | |
| 6,701,604 B2 | 3/2004 | Zeiler et al. | |
| 6,703,754 B1 | 3/2004 | Finkenbinder et al. | |
| 6,707,177 B1 | 3/2004 | Campbell et al. | |
| 6,707,181 B1 | 3/2004 | Militello et al. | |
| 6,713,916 B1 | 3/2004 | Williams et al. | |
| 6,842,966 B1 | 1/2005 | Campbell et al. | |
| 6,870,296 B2 | 3/2005 | Ho et al. | |
| 6,880,231 B2 | 4/2005 | Campbell et al. | |
| 6,927,512 B2 | 8/2005 | Zeiler et al. | |
| 6,977,452 B2 | 12/2005 | Ibach | |
| 7,064,462 B2 | 6/2006 | Hempe et al. | |
| 7,132,777 B2 | 11/2006 | Finkenbinder et al. | |
| 7,157,828 B2 | 1/2007 | Moroto et al. | |
| 7,166,939 B2 | 1/2007 | Voigt et al. | |
| 7,173,359 B2 | 2/2007 | Kong et al. | |
| 7,256,527 B2 | 8/2007 | Niimi | |
| 7,414,346 B1 | 8/2008 | Henmi et al. | |
| 7,459,819 B2 | 12/2008 | Finkenbinder et al. | |
| 7,466,056 B2 | 12/2008 | Golab et al. | |
| 7,495,367 B2 | 2/2009 | Braml et al. | |
| 7,521,826 B2 | 4/2009 | Hempe et al. | |
| 7,567,007 B2 | 7/2009 | Furui et al. | |
| 7,652,402 B2 | 1/2010 | Kinoshita et al. | |
| 7,683,519 B2 | 3/2010 | Finkenbinder et al. | |
| 7,777,380 B2 | 8/2010 | Rogelein | |
| 7,859,145 B2 | 12/2010 | Rapp et al. | |
| 7,944,112 B2 | 5/2011 | Kim et al. | |
| 7,952,241 B2 | 5/2011 | Kato et al. | |
| 7,977,835 B2 | 7/2011 | Simofi-Ilyes et al. | |
| 7,988,538 B2 | 8/2011 | Trautner et al. | |
| 8,049,380 B2 | 11/2011 | Li et al. | |
| 8,049,391 B2 | 11/2011 | Lau et al. | |
| 8,063,532 B2 | 11/2011 | Ahn | |
| 8,096,043 B2 | 1/2012 | Hargraves et al. | |
| 8,141,231 B2 | 3/2012 | Wolfe, Jr. et al. | |
| 8,154,169 B2 | 4/2012 | Qin et al. | |
| 8,294,328 B2 | 10/2012 | Lau et al. | |
| 2003/0111929 A1 | 6/2003 | Hong et al. | |
| 2004/0027028 A1 | 2/2004 | Ho et al. | |
| 2004/0171299 A1 | 9/2004 | Zeiler et al. | |
| 2004/0245886 A1 | 12/2004 | Uchida | |
| 2005/0134126 A1 | 6/2005 | Ibach | |
| 2005/0196273 A1 | 9/2005 | Nishikawa et al. | |
| 2006/0028088 A1 | 2/2006 | McFarland et al. | |
| 2007/0007846 A1 | 1/2007 | Niimi | |
| 2008/0084133 A1 | 4/2008 | Burton et al. | |
| 2009/0115266 A1 | 5/2009 | Hatfield et al. | |
| 2009/0121579 A1 | 5/2009 | Finkenbinder et al. | |
| 2009/0322166 A1 | 12/2009 | Satterfield et al. | |
| 2011/0200466 A1 | 8/2011 | VanBriston et al. | |
| 2013/0049523 A1 | 2/2013 | Shima et al. | |

FOREIGN PATENT DOCUMENTS

| | | |
|---|---|---|
| EP | 1763123 | 3/2007 |
| EP | 2197076 | 6/2010 |
| FR | 2932318 | 12/2009 |
| JP | S61106041 | 5/1986 |
| JP | S6441689 | 3/1989 |
| JP | H09261914 | 10/1997 |
| JP | H11056761 | 2/1998 |
| JP | 2004249425 | 9/2004 |
| JP | 2008172943 | 7/2008 |

OTHER PUBLICATIONS

EP search report dated Jan. 7, 2016 for EP Application No. 14180371.8.
EP search report dated Jan. 7, 2016 for EP Application No. 14180413.8.
EP search report dated Nov. 16, 2015 for EP Application No. 14180375.9.
EP search report dated Jan. 7, 2016 for EP Application No. 14180417.9.
EP search report dated Apr. 4, 2016 for EP Application No. 14180385.8.
EP search report dated Jan. 7, 2016 for EP Application No. 15193679.6.

* cited by examiner

BRUSH ASSEMBLY MOUNT

CROSS-REFERENCE TO RELATED APPLICATIONS

This utility application claims the benefit of U.S. Provisional Application No. 61/932,932 filed Jan. 29, 2014, content of which is incorporated herein by reference in its entirety.

FIELD OF THE DISCLOSURE

The present disclosure relates to a brush assembly for electric motors, and more particularly to a framed brushless motor having a brush assembly in electric power tools.

BACKGROUND

The statements in this section merely provide background information related to the present disclosure and may not constitute prior art.

Known portable power tools typically have an electric motor received within a tool housing. One common type of electric motor used in power tools has a rotor, a stator, and brushes. The rotor includes a rotor shaft, laminations mounted on the rotor shaft, armature windings wound in slots in the lamination stack, and a commutator mounted on the rotor shaft and electrically connected to the armature windings. The stator may have field windings wound in laminations, or may have permanent magnets. The brushes are mounted in brush housings, often known as brush boxes or brush holders, in sliding electrical contact with the commutator. Electric current is supplied from a power source through the brushes to the commutator, and from the commutator to the armature windings.

SUMMARY

According to an embodiment of the invention, an electric motor is provided including a stator assembly including a stator body and a plurality of magnets attached to an inner surface of the stator body via an adhesive and an armature rotatably received within the stator assembly and including a shaft on which a commutator is mounted. The motor further includes a brush assembly including a brush card mount disposed around the commutator and a mating housing longitudinally extending from the brush card mount. In an embodiment, the mating housing includes a cylindrical wall and a mating surface formed substantially perpendicularly to an inner surface of the cylindrical wall and arranged to mate with an end surface of the stator body. The mating surface of the mating housing includes posts longitudinally extending along the inner surface of the cylindrical wall and recessed surfaces formed therebetween, where the posts are mounted on the end surface of the stator body.

According to an embodiment, the posts are aligned with area of the stator body between mounting surfaces of the magnets. In an embodiment, adhesive contaminations are present at the end surface of the stator body, and the adhesive contaminations are received within the recessed surfaces of the mating surface.

In an embodiment, the cylindrical wall of the mating housing overlaps and at least partially covers an outer surface of the stator body. In an embodiment, the posts are integrally formed on the inner surface of the cylindrical wall.

In an embodiment, at least one of the posts includes a notch further projecting longitudinally therefrom towards the stator assembly, and the stator body includes a corresponding cut-off portion that received the notch for proper alignment of the stator assembly with the brush assembly.

In an embodiment, two opposing posts of the plurality of posts include fastener receptacles. In an embodiment, an end cap arranged on the other end surface of the stator assembly opposite the brush assembly. In an embodiment, the end cap is secured to the stator assembly and the brush assembly via fasteners.

DETAILED DESCRIPTION

Reference will now be made in detail to various aspects and embodiments of the invention, examples of which are illustrated in the accompanying drawings.

Figure 1A:
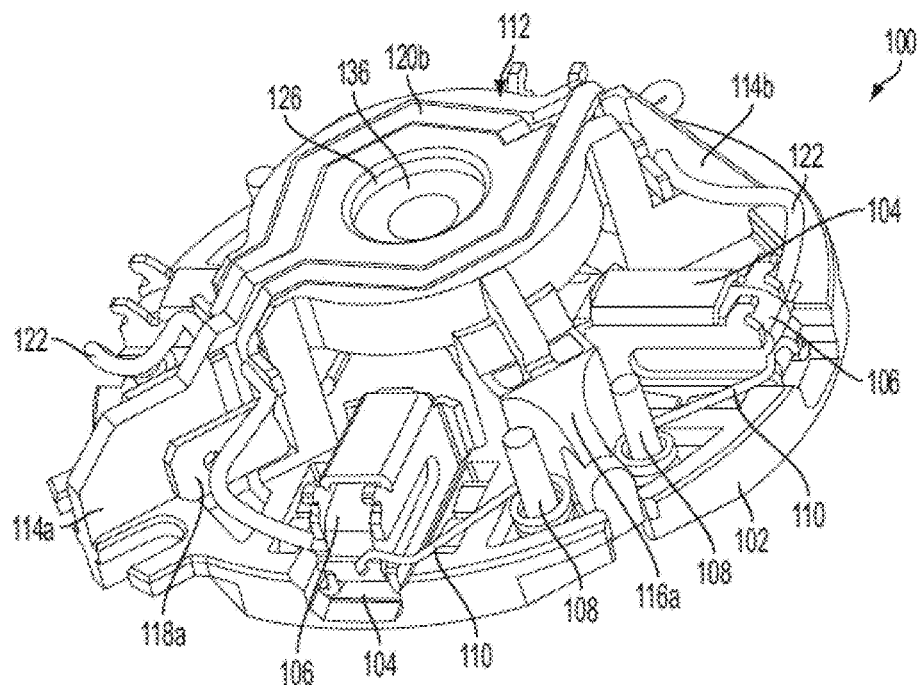
FIGS. 1A and 1B depict perspective side views of a four-pole brush assembly (also referred to herein as brush card) 100, according to an embodiment.
Figure 1B:
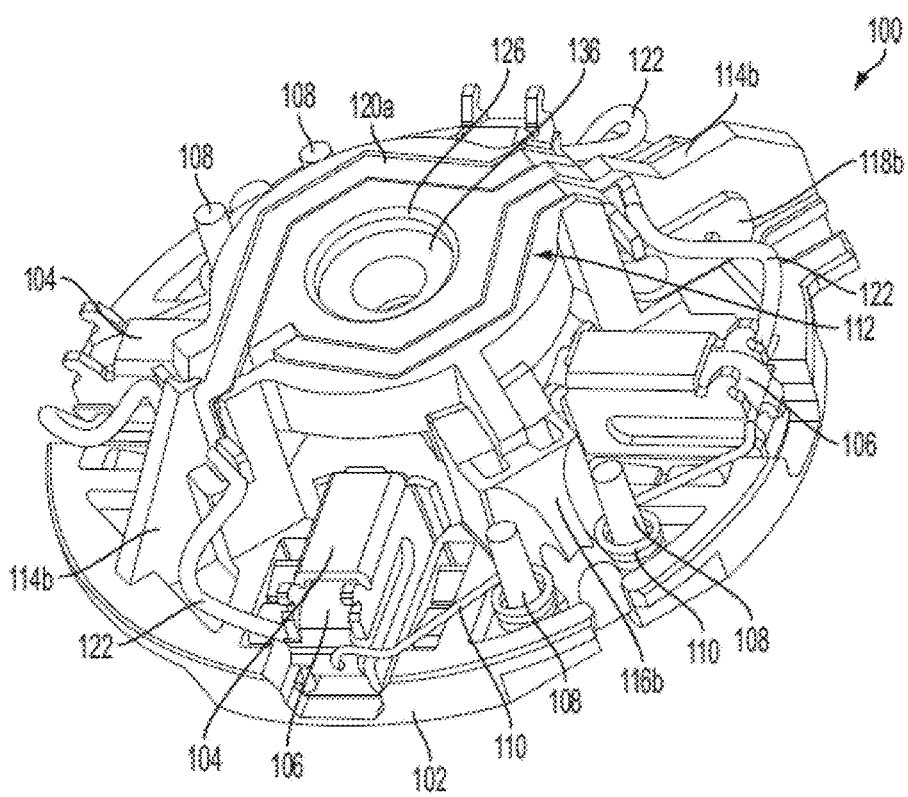
Figure 2:
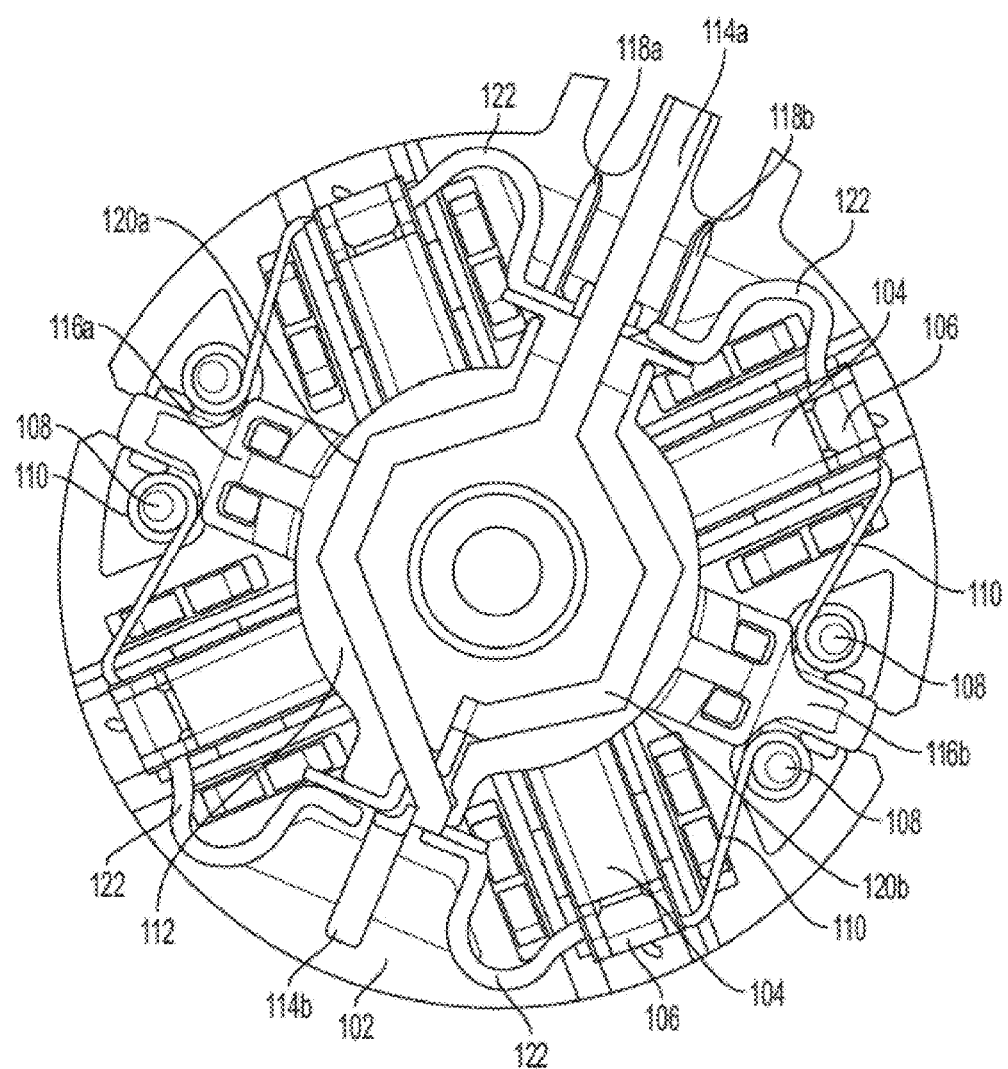
FIGS. 2 and 3 respectively depict top and bottom views of the four-pole brush card 100, according to an embodiment.
Figure 3:
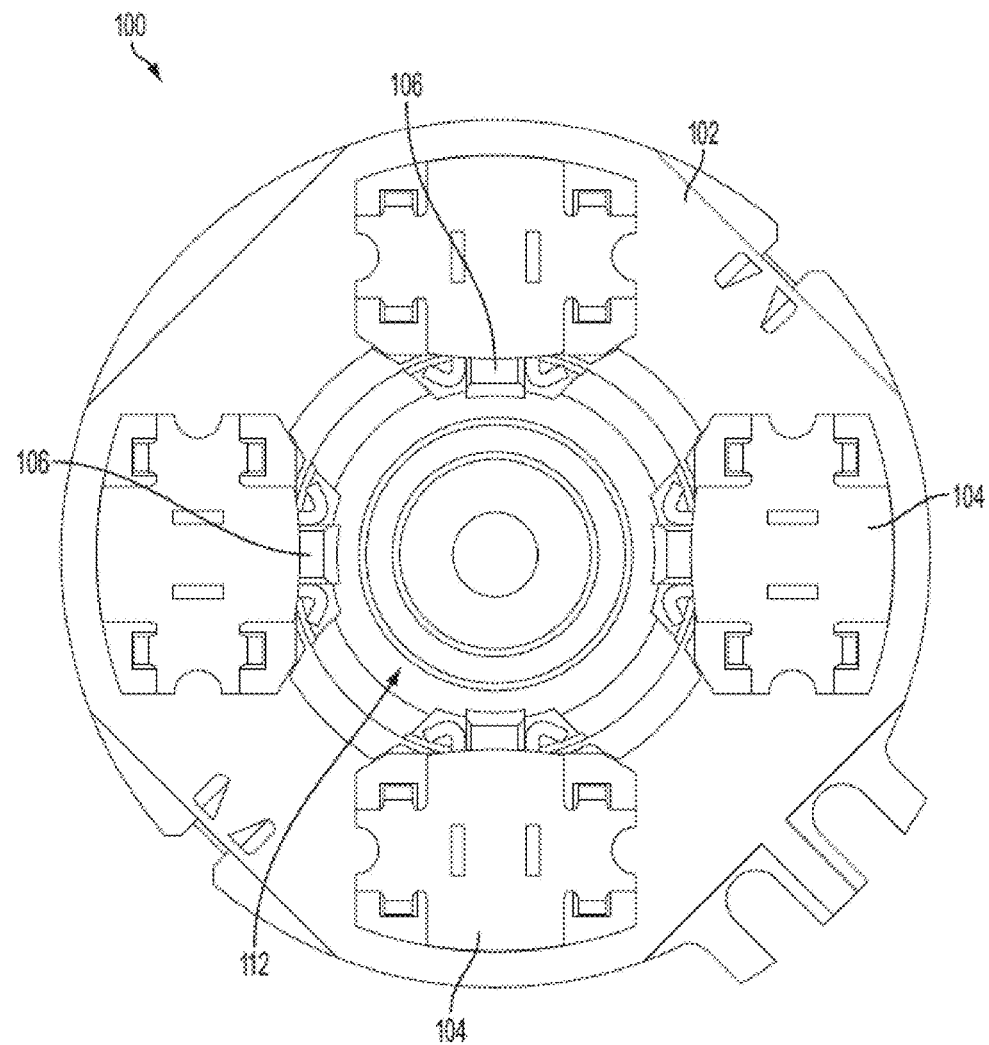

FIGS. 1A and 1B depict perspective side views of a four-pole brush assembly (also referred to herein as brush card) 100, according to an embodiment of the invention. FIGS. 2 and 3 respectively depict top and bottom views of the four-pole brush card 100, according to an embodiment. In this embodiment, brush card 100 includes a brush card mount 102 and four brush holders 104. The brush card mount 102 has a substantially circular circumference and the four brush holders 104 are arranged equidistantly on four sides of the brush card mount 102. Each brush holder 104 accommodates a brush 106 therein. The brushes 106 housed in brush holders 104 facing each other are electrically connected to one another, as discussed below. Both ends of each brush holder 104 are open to allow radial movement of the brush 106 towards and away from a center of the brush card 100. The brush card mount 102 includes upright posts 108 in close proximity to the brush holders 104. Each post 108 is arranged to hold a wound portion of a spring 110. Each spring 110 includes an extended arm that engages a back surface of brush 106 inside the brush holder 104 to bias the brush 106 towards the center of the brush card 100.

According to an embodiment, brush card mount 102 includes a planar portion, to which brush holders 104 are secured. A middle section of the planar portion includes an opening that receives a motor commutator (not shown). The brush card mount 102 also includes a bridge portion 112 arranged above the commutator opening (and the commutator) and connected to the planar portion via four bridge legs 114a, 114b, 116a, and 116b. Bridge legs 114a, 114b, 116a, and 116b extend longitudinally (i.e., in the direction of the motor, at a substantially right angle with respect to the plane of the brush card mount 102) from the planar portion to the bridge portion 112. Radially formed between bridge legs 114a, 114b, 116a, and 116b are gaps that allow for the radial movement of brushes 106.

According to an embodiment, bridge leg 114a and 114b form walls that extend radially from the bridge portion 112 to (or near) outer edges of the brush card mount 102. In an embodiment, the bridge legs 116a and 116b similarly extend towards (or near) outer edges of the brush card mount 102. This arrangement strengthens support for the bridge portion 112. In addition, bridge leg 114a mechanically supports and electrically isolates two terminals 118a and 118b provided on both sides of its outward-extending wall. Terminals 118a and 118b are connected to metal routings 120a and 120b, which extend over the bridge portion 112 to bridge leg 114b. Metal routings 120a and 120b connect the brushes 106 facing each other to one of the terminals 118a and 118b. Specifically, ends of metal routings 120a and 120b are connected via wires 122 to either corresponding brush holders 104 or brushes 106 via wires 120. In an embodiment, metal routings 120a, 120b are routed around a shaft bearing pocket 126, which holds a shaft bearing 136, as discussed below in detail. In an embodiment, metal routing 120a crosses over routing 120b to allow for opposite brushes 106/brush holders 104 to be connected to the same terminal 118a or 118b.

Figure 4:
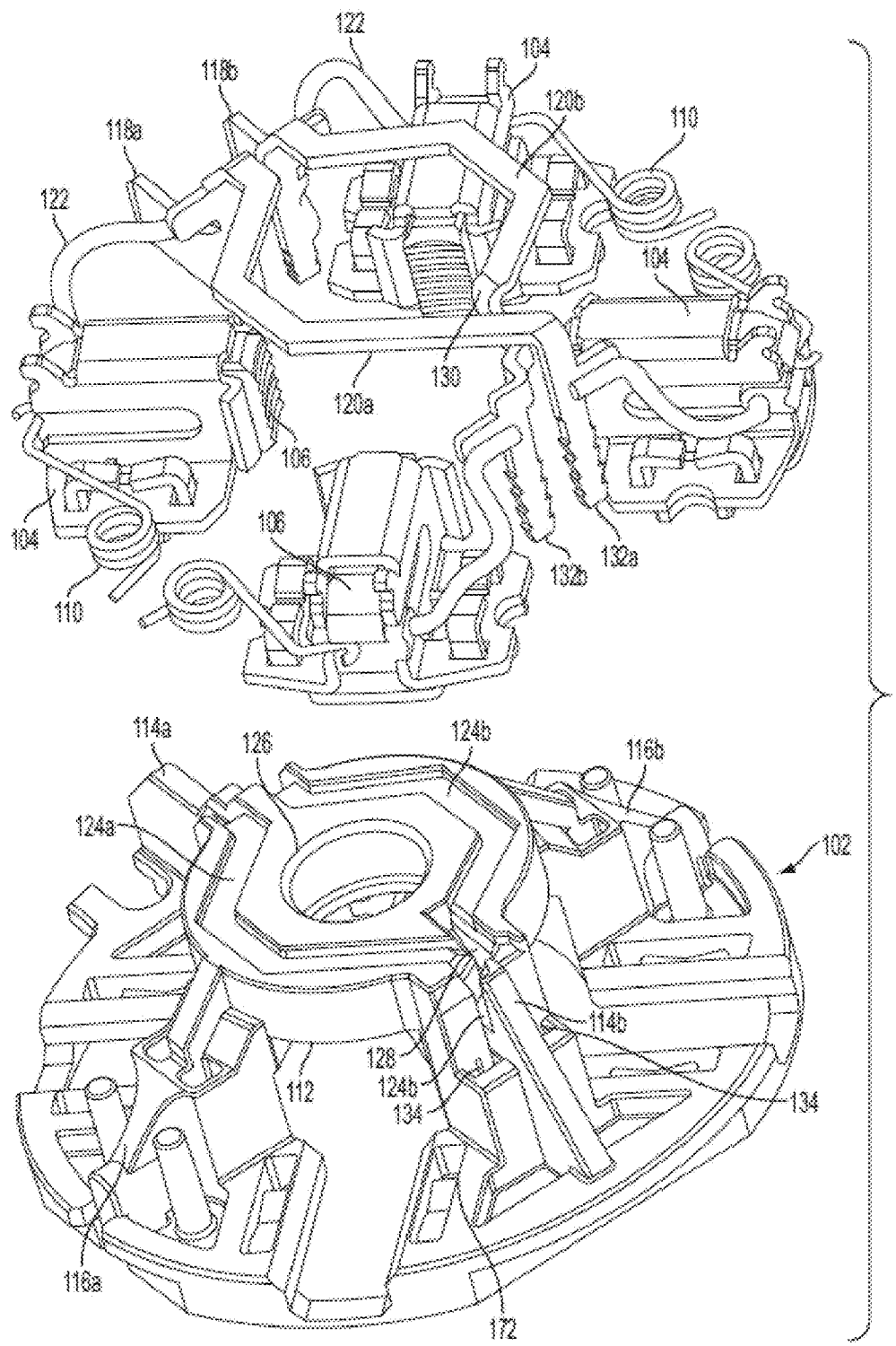
FIG. 4 depicts a perspective expanded view of brush card 100, according to an embodiment.

FIG. 4 depicts a perspective expanded view of brush card 100, according to an embodiment. In this figure, brush card mount 102 is depicted separately from the rest of the brush card 100 components. In an embodiment, bridge portion 112 of the brush card mount 102 includes channels 124a, 124b that accommodate metal routings 120a, 120b. Each of the channels 124a, 124b in this embodiment extends from leg 114a to leg 114b, around shaft bearing pocket 126. Metal routings 120a, 120b include vertically-extending teethed ends 132a, 132b on both ends, arranged to get pushed into slots 134 of bridge legs 114a, 114b during the assembly process. It is noted that other means such as an adhesive or molding mean be used to secure the metal routings 120a, 120b to the bridge portion 112. Terminals 118a and 118b integrally extend from the routings 120a and 120b above the teethed ends 132a and 132b on the two sides of leg 114a. Channel 124b includes a recessed portion 128 that penetrates into bridge portion 112 between the shaft bearing pocket 126 and the bridge leg 114b. In an embodiment, recessed portion 128 is substantially vertical. The channel 124b extends out through the bridge portion 112 from the end of the recessed portion 128 along a lower plane. The recessed portion 128 intersects a portion of channel 124a.

Metal routing 120b includes a penetrating portion 130 that is received inside the recessed portion 128 of channel 124b. In an embodiment, the penetrating portion 130 is substantially vertical. This allows routing 120a to cross over metal routing 120b as it extends through channel 124a to bridge leg 114b. This arrangement creates a gap between the metal routings 120a and 120b that, in an embodiment, is 1-3 mm. This gap is sufficient to prevent an electrical shortage.

Various aspects and details of the brush assembly 100 are disclosed in co-pending patent application Ser. No. 14/453, 706 filed Aug. 7, 2014, which is incorporated herein by reference in its entirety. The brush assembly 100 shown in FIGS. 1-4 may be for use primarily with frameless motors, where the tool housing includes features to house, support, and align the brush assembly 100 with respect to the motor. By contrast, in a motor pack, where all the motor components and the brush assembly are assembled and secured together as a part of a single pack, the motor components are held together independently of the tool housing. As aspect of the invention discussed below is directed to such a motor pack.

Figure 5:
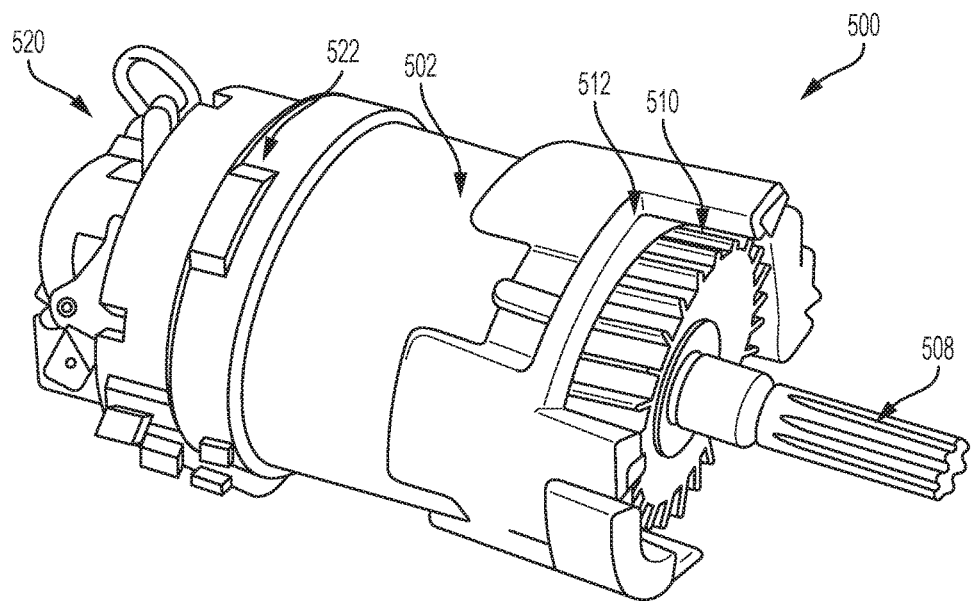
FIG. 5 depicts a perspective view of a motor assembly, according to an embodiment of the invention.
Figure 6:
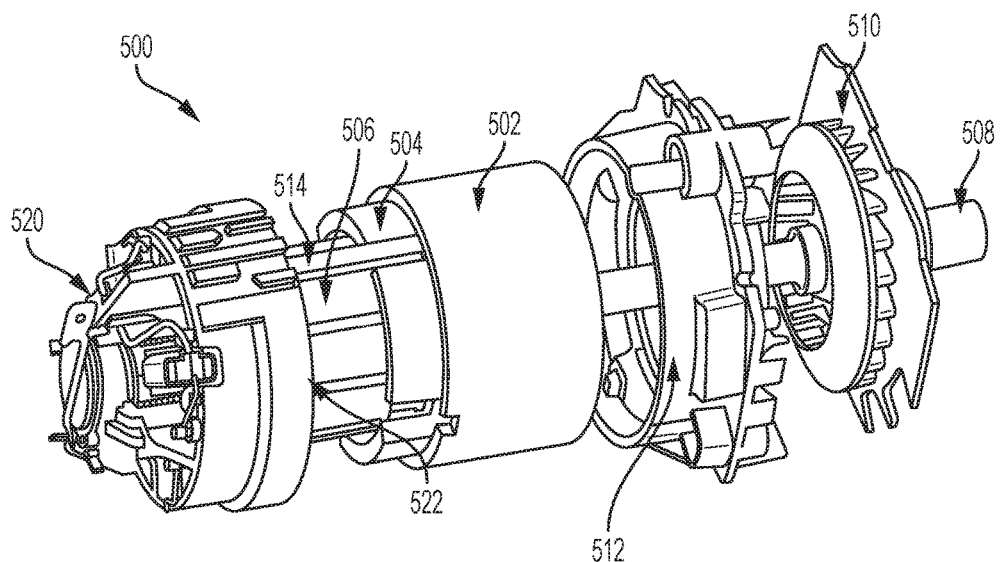
FIG. 6 depicts a perspective expanded view of the motor assembly, according to an embodiment.

FIG. 5 depicts an exemplary motor assembly (i.e., motor pack) 500, according to an embodiment. FIG. 6 depicts an expanded view of a motor assembly 500, in an embodiment. As shown in these figures, motor assembly 500 includes a stator body (which may be a field can or a lamination stack) 502 with magnets 504 attached to an inner surface thereof. In the expanded view of FIG. 6, the magnets 504 have been pulled out of the stator body 502, though it is understood that the magnets 504 are securely attached to an inner surface of the stator body 502. Framed motor 500 further includes a rotor assembly 506 rotatably disposed within the stator body 502, a rotor shaft 508 rotatably attached to the rotor assembly 506, a commutator (not shown) mounted on the shaft 508 on one side of the stator body 502, a fan 510 disposed on the rotor shaft 508 on the other side of the stator body 502, and an end cap 512 attached to an end of the stator body 502 between the stator body 502 and the fan 510. In an embodiment, the end cap 512 partially contains the fan to redirect air away from the fan as needed. On the other end of the stator body 502 is disposed a brush assembly 520. Brush assembly 520 includes many of the features of brush assembly 100 discussed above, but additionally includes a mating housing 522 that extend longitudinally from the outer periphery of the brush card mount in the direction of the stator body 502 to mate with the stator body 502. In an embodiment, fasteners 514 attach the brush assembly 520, stator 502, and end cap 512 together.

Figure 7:
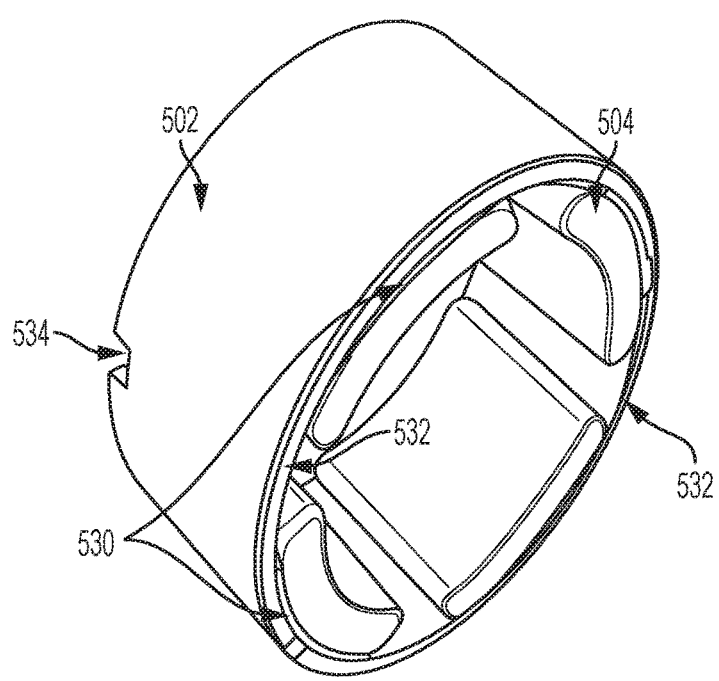
FIG. 7 depicts a perspective view of a stator assembly, according to an embodiment.
Figure 8:
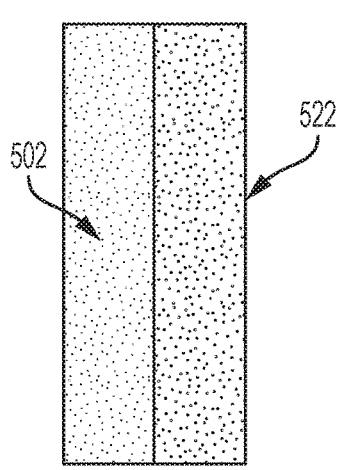
FIGS. 8 and 9 depict cross-sectional view of mating surfaces of the stator body and the brush assembly with and without adhesive contamination, according to an embodiment.
Figure 9:
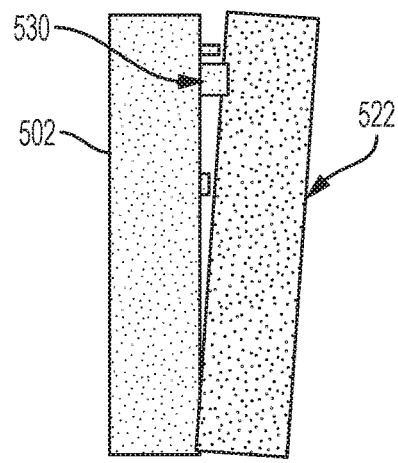

FIG. 7 depicts stator body 502 with magnets 504 secured on the inner surface thereof. Although stator body 502 illustrated in this figure is a solid cylindrical field can, a lamination stack may be similarly utilized. In an embodiment, the magnets 504 may be secured to the stator body 502 via an adhesive. The adhesive is typically applied to the magnets 504 prior to attachment of the magnets 504 to the inner surface of the stator body 502. Once the magnets 504 are secured, any excess adhesive that leaks around the magnets 504, particularly at the ends of the stator body 502, is wiped clean. Despite this step, however, some excess adhesive contamination 530 may be left over on the ends of the stator body 502 after the adhesive is dried. This excess adhesive 530 is particularly problematic in a motor pack described above, where the end of the stator body 502 mates with the end cap 512 and the brush assembly 520. The excess adhesive contamination 530 interferes with the surface attachment of the brush assembly and the end cap 512 to the two ends of the stator body 502 and causes the pieces to warp. FIGS. 8 and 9 depict side views of how the excess adhesive contamination 530 at the end surfaces of the stator body 502 can interfere with proper assembly of the additional components, such as the mating housing 522 of the brush assembly 520 with the stator body 502 and increase the motor tolerances.

According to an embodiment of the invention, in order to ensure that adhesive contamination at the end surfaces of the stator body 502 does not interfere with proper assembly of the motor and add to motor tolerances, the brush assembly 520 and/or the end cap 512 are provided with integrated posts (or stands, or projections) longitudinally projecting from a mating surface thereof. The posts are arranged on the mating surface in alignment with areas of the stator body 502 where excess adhesive contamination is less likely to be present, e.g., between magnet segments where no adhesive is applied. For example, the posts may be arranged to come in contact with areas 532 (See FIG. 7) of the outer surface of the stator body 502 between the mounting surfaces of the magnets 504. When the mating surface of the brush assembly 520 and/or the end cap 512 is mounted on the end of the stator body 502, the posts come in contact with the end of the stator body 502 and the excess adhesive 530 on the stator body 502 fits between the posts, thus preventing the mating surface to bend or deform.

Figure 10:
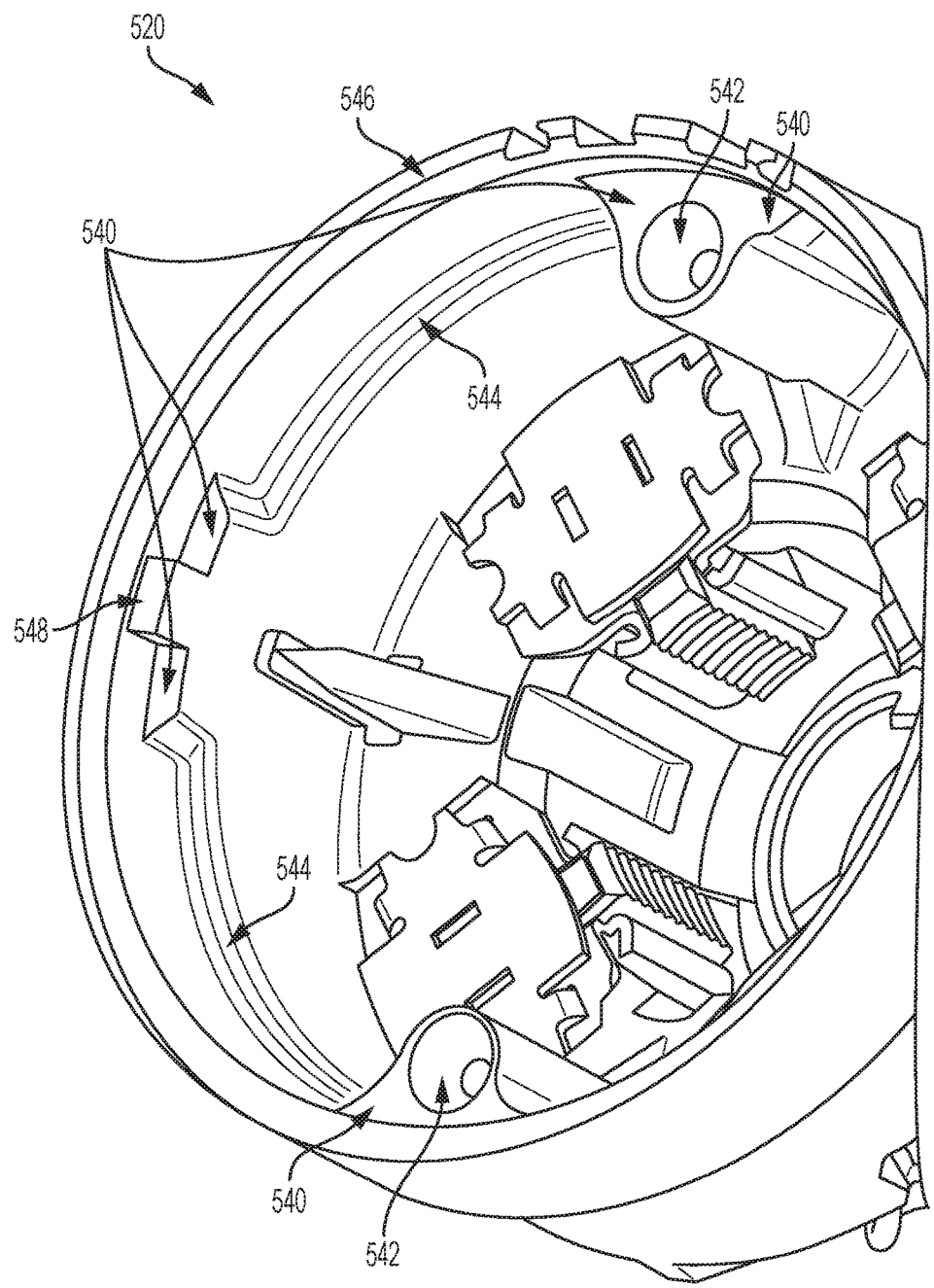
FIG. 10 depicts a perspective rear view of the brush assembly, according to an embodiment.

FIG. 10 illustrates an exemplary perspective rear view of brush assembly 520 having posts 540, according to an embodiment of the invention. In this embodiment, four posts 540 are provided in alignment with the areas 532 (see FIG. 7) between the four magnet segments. Two of opposing posts 540 including fastening receptacles 542 arranged to receive fasteners 514 (see FIG. 6) for attaching the brush assembly 520 and the end cap 512. The magnets are aligned with the recessed surfaces 544 formed between these posts 540 on the mating surface of the mating housing 522 of the brush assembly 520. It is noted that the posts 540 and recessed surfaces 544 together formed the mating surface of the mating housing 522. In an embodiment, posts 540 project from the recessed surfaces 544 towards the stator body 502. The excess adhesive from the magnets will be disposed within the recessed surfaces 544 once the assembly process is complete. This arrangement prevents the excess adhesive from interfering with the assembly.

In an embodiment, the mating surface of the mating housing 522 is disposed within a cylindrical wall 546 that that overlaps and partially covers the outer surface of the stator body 502. In an embodiment, the recessed surfaces 544 and posts 540 are formed integrally on an inner surface of the cylindrical wall 546.

In an embodiment, at least one of the posts 540 is further provided with a notch 548 further projecting towards the stator body 502. The notch 548 in this embodiment is arranged to align with and form-fittingly fit into a cutoff portion 534 in the stator body 502 (see FIG. 7) for proper alignment of the stator body 502 with respect to the brush assembly 520. During the assembly process, the cutoff portion 534 and the notch 548 are aligned before the brush assembly 520 is mounted on the stator body 502.

The description of the invention is merely exemplary in nature and, thus, variations that do not depart from the gist of the invention are intended to be within the scope of the invention. Such variations are not to be regarded as a departure from the scope of the invention.

The invention claimed is:

1. An electric motor comprising:
   a stator assembly including a stator body and a plurality of magnets attached to an inner surface of the stator body via an adhesive;
   an armature rotatably received within the stator assembly, the armature having an armature shaft on which a commutator is mounted; and
   a brush assembly including a brush card mount disposed around the commutator and a mating housing longitudinally extending from the brush card mount, the mating housing including a cylindrical wall and a mating surface formed substantially perpendicularly to an inner surface of the cylindrical wall and arranged to mate with an end surface of the stator body, wherein the mating surface of the mating housing includes a plurality of posts longitudinally extending along the inner surface of the cylindrical wall and a plurality of recessed surfaces formed therebetween, the posts being mounted on the end surface of the stator body,
   wherein the stator assembly includes adhesive contamination at the end surface of the stator body, the adhesive contaminations being received within the recessed surfaces of the mating surface.

2. The electric motor of claim 1, wherein the posts are aligned with area of the stator body between mounting surfaces of the magnets.

3. The electric motor of claim 1, wherein the cylindrical wall of the mating housing overlaps and at least partially covers an outer surface of the stator body.

4. The electric motor of claim 1, wherein at least one of the posts includes a notch further projecting longitudinally therefrom towards the stator assembly, and the stator body includes a corresponding cut-off portion that received the notch for proper alignment of the stator assembly with the brush assembly.

5. The electric motor of claim 1, wherein two opposing posts of the plurality of posts include fastener receptacles.

6. The electric motor of claim 1, further comprising an end cap arranged on the other end surface of the stator assembly opposite the brush assembly.

7. The electric motor of claim 6, wherein the end cap is secured to the stator assembly and the brush assembly via a plurality of fasteners.

8. The electric motor of claim 1, wherein the plurality of posts are integrally formed on the inner surface of the cylindrical wall.

9. A power tool comprising:
   a housing; and
   an electric motor disposed within the housing, the motor including: a stator assembly including a stator body and a plurality of magnets attached to an inner surface of the stator body via an adhesive, an armature rotatably received within the stator assembly, the armature having an armature shaft on which a commutator is mounted, and a brush assembly including a brush card mount disposed around the commutator and a mating housing longitudinally extending from the brush card mount,
   wherein the mating housing includes a cylindrical wall and a mating surface formed substantially perpendicularly to an inner surface of the cylindrical wall and arranged to mate with an end surface of the stator body, the mating surface of the mating housing includes a plurality of posts longitudinally extending along the inner surface of the cylindrical wall and a plurality of recessed surfaces formed therebetween, the posts being mounted on the end surface of the stator body,
   wherein the stator assembly includes adhesive contamination at the end surface of the stator body, the adhesive contaminations being received within the recessed surfaces of the mating surface.

10. The power tool of claim 9, wherein the posts are aligned with area of the stator body between mounting surfaces of the magnets.

11. The power tool of claim 9, wherein the cylindrical wall of the mating housing overlaps and at least partially covers an outer surface of the stator body.

12. The power tool of claim 9, wherein at least one of the posts includes a notch further projecting longitudinally therefrom towards the stator assembly, and the stator body includes a corresponding cut-off portion that received the notch for proper alignment of the stator assembly with the brush assembly.

13. The power tool of claim 9, wherein two opposing posts of the plurality of posts include fastener receptacles.

14. The power tool of claim 9, further comprising an end cap arranged on the other end surface of the stator assembly opposite the brush assembly.

15. The power tool of claim 14, wherein the end cap is secured to the stator assembly and the brush assembly via a plurality of fasteners.

16. The power tool of claim 9, wherein the plurality of posts are integrally formed on the inner surface of the cylindrical wall.

* * * * *